United States Patent
Hashimoto et al.

(10) Patent No.: US 11,975,472 B2
(45) Date of Patent: May 7, 2024

(54) METHOD FOR FORMING BELT-LIKE RUBBER MEMBER

(71) Applicant: Toyo Tire Corporation, Itami (JP)

(72) Inventors: Yoshiki Hashimoto, Itami (JP); Ryoshi Miyamoto, Itami (JP)

(73) Assignee: Toyo Tire Corporation, Itami (JP)

( * ) Notice: Subject to any disclaimer, the term of this patent is extended or adjusted under 35 U.S.C. 154(b) by 291 days.

(21) Appl. No.: 17/603,170

(22) PCT Filed: May 14, 2020

(86) PCT No.: PCT/JP2020/019226
§ 371 (c)(1),
(2) Date: Oct. 12, 2021

(87) PCT Pub. No.: WO2020/235436
PCT Pub. Date: Nov. 26, 2020

(65) Prior Publication Data
US 2022/0184870 A1 Jun. 16, 2022

(30) Foreign Application Priority Data
May 17, 2019 (JP) .................. 2019-093500

(51) Int. Cl.
*B29C 48/92* (2019.01)
*B29C 48/08* (2019.01)
(Continued)

(52) U.S. Cl.
CPC .............. *B29C 48/92* (2019.02); *B29C 48/08* (2019.02); *B29C 48/255* (2019.02); *B29C 48/305* (2019.02); *B29L 2029/00* (2013.01)

(58) Field of Classification Search
CPC ......... B29C 48/31; B29C 48/35; B29C 41/26; B29C 48/2665; B29C 48/266
See application file for complete search history.

(56) References Cited

U.S. PATENT DOCUMENTS 6,688,872 B2 * 2/2004 Ohki ................. B29C 48/92
425/327
10,005,206 B2 * 6/2018 Kitamura ........... B29D 30/3007
(Continued)

FOREIGN PATENT DOCUMENTS

JP 2002-127234 A 5/2002
JP 2003-266555 A 9/2003
(Continued)

OTHER PUBLICATIONS

Office Action dated Sep. 9, 2022, issued in counterpart JP application No. 2019-093500, with English translation, (8 pages).
(Continued)

Primary Examiner — Benjamin A Schiffman
(74) Attorney, Agent, or Firm — WHDA, LLP (57) ABSTRACT

A method for forming a belt-like rubber sheet S by extruding rubber on a drum outer peripheral surface 3a by an extruder 2 includes: a front end forming step for forming a front end S1 having a wedge-shaped cross section; an intermediate part forming step for forming an intermediate part S2 having a desired thickness; and a rear end forming step for forming a rear end S3 having a wedge-shaped cross section by gradually decreasing an extrusion amount of the rubber to zero from a predetermined extrusion amount in a predetermined time, gradually decreasing the rotational speed of the drum outer peripheral surface 3a to zero from a predetermined rotational speed in the predetermined time, and gradually decreasing a distance from the drum outer peripheral surface 3a to a die 21 to an extrusion end distance from a predetermined distance in the predetermined time.

4 Claims, 9 Drawing Sheets

(51) Int. Cl.
  *B29C 48/255*   (2019.01)
  *B29C 48/305*   (2019.01)
  *B29L 29/00*    (2006.01)

(56) References Cited

U.S. PATENT DOCUMENTS

| | | |
|---|---|---|
| 2002/0048615 A1 | 4/2002 | Ohki |
| 2010/0230034 A1* | 9/2010 | Matsuoka ............... B29C 48/08 |
| | | 156/125 |
| 2015/0008618 A1 | 1/2015 | Kitamura |
| 2017/0297285 A1 | 10/2017 | Hashimoto et al. |

FOREIGN PATENT DOCUMENTS

| | | | |
|---|---|---|---|
| JP | 2008-126560 A | | 6/2008 |
| JP | 2010-234707 A | | 10/2010 |
| JP | 2013-220569 A | | 10/2013 |
| JP | 2016-159608 A | | 9/2016 |
| JP | 2017-193088 A | | 10/2017 |
| JP | 2018-47561 A | | 3/2018 |
| JP | 2018047561 A | * | 3/2018 |
| WO | 2008/001432 A1 | | 1/2008 |

OTHER PUBLICATIONS

Office Action dated Jul. 28, 2022, issued in counterpart CN Application No. 202080007566.0, with English Translation. (2 pages).
International Search Report dated Jul. 28, 2020, issued in counterpart International Application No. PCT/JP2020/019226. (2 pages).

* cited by examiner

METHOD FOR FORMING BELT-LIKE RUBBER MEMBER

TECHNICAL FIELD

The present invention relates to a method and apparatus for forming a belt-like rubber member.

BACKGROUND ART

Patent Documents 1 and 2 below disclose a method for forming a cylindrical rubber member, in which, by controlling an extrusion amount of rubber from an extruder, rotation of a forming drum, and a distance between the extruder and the forming drum, a winding start part which has a wedge-shaped cross section with a gradually increased thickness is formed, and a winding end part which has a wedge-shaped cross section with a gradually decreased thickness is overlapped with and formed on the winding start part, in order to eliminate a difference in height at a joint portion.

Patent Document 3 below discloses a bead core covering method for winding, from a front end, a rubber sheet extruded from an extruder around an outer peripheral surface of a rotary drum, and before the rubber sheet is wound around the entire circumference of the outer peripheral surface of the rotary drum, affixing, from the front end, the rubber sheet located on the outer peripheral surface of the rotary drum onto an outer surface of a rotating bead core.

In Patent Documents 1 and 2, when the winding end part is formed, the winding end part can be formed only on the winding start part. In Patent Document 3, the winding end part having a wedge-shaped cross section is formed by gradually decreasing the extrusion amount of the rubber and gradually decreasing the distance between the extruder and the rotary drum. However, since the winding end part is formed while the rotary drum is rotated, it is difficult to affix and hold the winding end part on the rotary drum.

PRIOR ART DOCUMENTS

Patent Documents

Patent Document 1: JP-A-2013-220569
Patent Document 2: JP-A-2018-47561
Patent Document 3: JP-A-2017-193088

SUMMARY OF THE INVENTION

Problems to be Solved by the Invention

In view of this, an object of the present invention is to provide a method and apparatus for forming a belt-like rubber member with which it is possible to directly affix and form a rear end having a wedge-shaped cross section on a forming surface.

Means for Solving the Problems

The above object can be achieved by the present invention as described below.

That is, a method for forming a belt-like rubber member by extruding rubber onto a forming surface by an extruder according to the present invention includes:

an extrusion start step for bringing a die of the extruder close to the forming surface until a distance between the die and the forming surface reaches an extrusion start distance, starting extrusion of rubber from the die, and starting movement of the forming surface in a direction parallel to the forming surface;

a front end forming step for forming a front end having a wedge-shaped cross section by gradually increasing an extrusion amount of the rubber from zero to a predetermined extrusion amount in a predetermined time, gradually increasing a movement speed of the forming surface from zero to a predetermined movement speed in the predetermined time, and gradually increasing the distance from the forming surface to the die from the extrusion start distance to a predetermined distance that is equal to a desired thickness of the belt-like rubber member in the predetermined time;

an intermediate part forming step for forming an intermediate part having the desired thickness by maintaining the extrusion amount of the rubber at the predetermined extrusion amount, maintaining the movement speed of the forming surface at the predetermined movement speed, and maintaining the distance from the forming surface to the die at the predetermined distance; and a rear end forming step for forming a rear end having a wedge-shaped cross section by gradually decreasing the extrusion amount of the rubber from the predetermined extrusion amount to zero in the predetermined time, gradually decreasing the movement speed of the forming surface from the predetermined movement speed to zero in the predetermined time, and gradually decreasing the distance from the forming surface to the die from the predetermined distance to an extrusion end distance in the predetermined time.

The method for forming a belt-like rubber member according to the present invention may further include a rear end affixing step for maintaining the extrusion amount of the rubber at zero, maintaining the movement speed of the forming surface at zero, and maintaining the distance from the forming surface to the die at the extrusion end distance, after the rear end forming step is completed.

Further, in the method for forming a belt-like rubber member according to the present invention, the extruder may be provided with a gear pump capable of supplying the rubber to the die by rotating a gear that is incorporated in the gear pump, and the gear in the gear pump may be reversely rotated for a predetermined time at a predetermined rotation speed in the rear end affixing step.

In addition, in the method for forming a belt-like rubber member according to the present invention, the movement of the forming surface may be restarted while the distance from the forming surface to the die is maintained at the extrusion end distance, after the rear end affixing step is completed.

In the method for forming a belt-like rubber member according to the present invention, the rear end having a wedge-shaped cross section is formed by gradually decreasing the extrusion amount of the rubber from a predetermined extrusion amount to zero in a predetermined time, gradually decreasing the movement speed of the forming surface from a predetermined movement speed to zero in the predetermined time, and gradually decreasing the distance from the forming surface to the die from a predetermined distance to the extrusion end distance in the predetermined time. According to this configuration, the rear end having a wedge-shaped cross section can be directly affixed to and formed on the forming surface. In addition, it is possible to eliminate a difference in height at a joint portion by overlapping and joining the rear end having a wedge-shaped cross section with the front end having a wedge-shaped cross section.

In addition, an apparatus for forming a belt-like rubber member according to the present invention includes:

an extruder that extrudes rubber from a die;

a forming surface on which the rubber extruded from the die is affixed;

an extruder moving device that moves the extruder close to or away from the forming surface;

a forming-surface moving device that moves the forming surface in a direction parallel to the forming surface; and a control unit that controls the extruder, the extruder moving device, and the forming-surface moving device, wherein the control unit brings the die of the extruder close to the forming surface until a distance from the forming surface to the die reaches an extrusion start distance, starts extrusion of the rubber from the die, starts movement of the forming surface in the direction parallel to the forming surface, forms the front end having a wedge-shaped cross section by gradually increasing an extrusion amount of the rubber from zero to a predetermined extrusion amount in a predetermined time, gradually increasing a movement speed of the forming surface from zero to a predetermined movement speed in the predetermined time, and gradually increasing the distance from the forming surface to the die from the extrusion start distance to a predetermined distance that is equal to a desired thickness of the annular rubber member in the predetermined time, forms an intermediate part having the desired thickness by maintaining the extrusion amount of the rubber at the predetermined extrusion amount, maintaining the movement speed of the forming surface at the predetermined movement speed, and maintaining the distance from the forming surface to the die at the predetermined distance, and forms the rear end having a wedge-shaped cross section by gradually decreasing the extrusion amount of the rubber from the predetermined extrusion amount to zero in the predetermined time, gradually decreasing the movement speed of the forming surface from the predetermined movement speed to zero in the predetermined time, and gradually decreasing the distance from the forming surface to the die from the predetermined distance to an extrusion end distance in the predetermined time.

In the apparatus for forming a belt-like rubber member according to the present invention, the die may have an end surface facing the forming surface, the end surface having curved surfaces at edge parts on a front side and a rear side in the direction of movement of the forming surface.

The operation and effect of the apparatus for forming a belt-like rubber member having the above configuration are the same as those of the method for forming a belt-like rubber member described above, and the rear end having a wedge-shaped cross section can be directly affixed to and formed on the forming surface.

MODE FOR CARRYING OUT THE INVENTION

Figure 1:
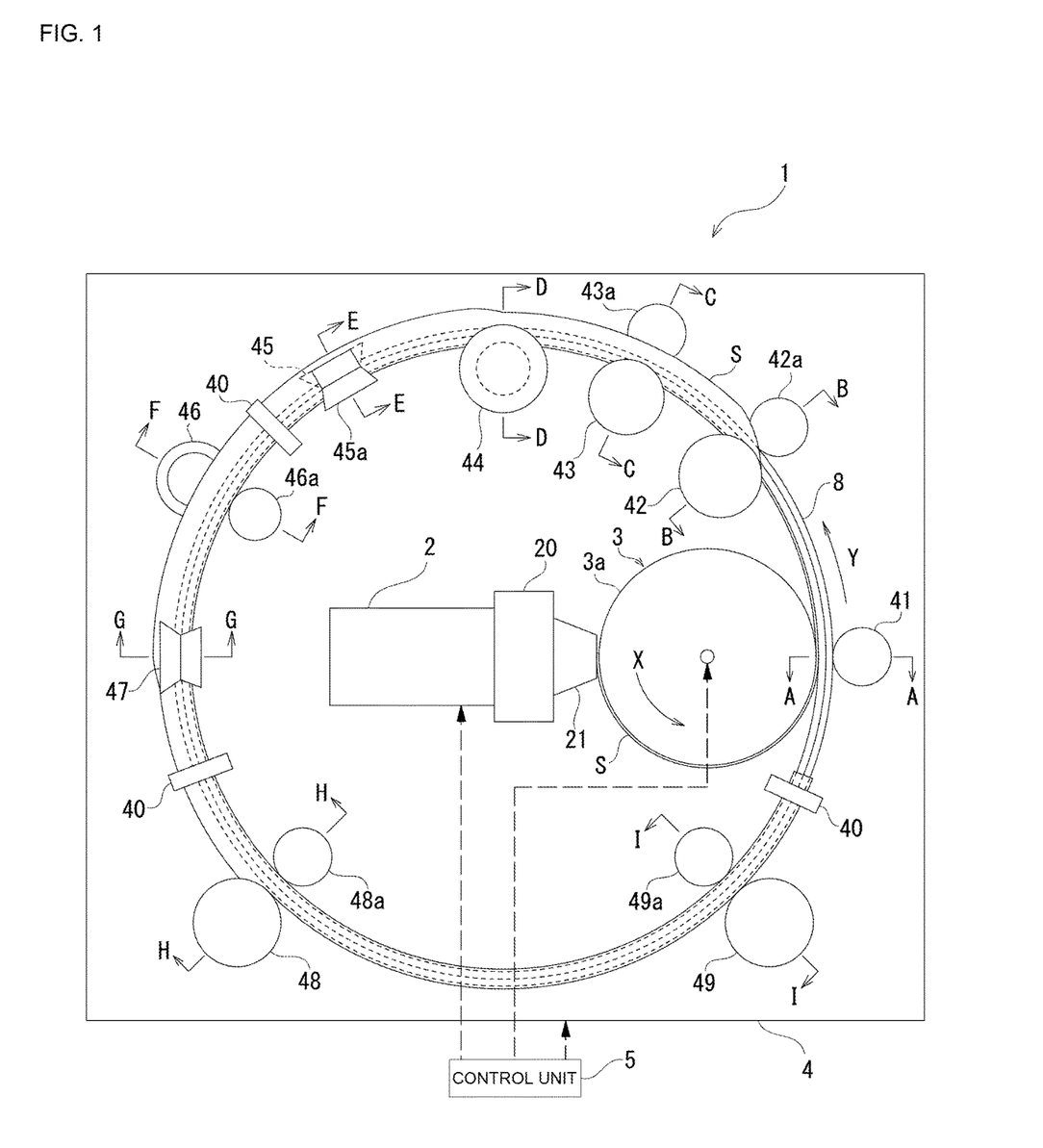
FIG. 1 is a schematic diagram illustrating an example of a configuration of a bead core covering apparatus.

Embodiments of the present invention will be described below with reference to the drawings. FIG. 1 illustrates a bead core covering apparatus 1 that covers an annular bead core 8 with a long belt-like rubber sheet S having a predetermined width. A method and apparatus for forming a belt-like rubber member according to the present invention are for forming the belt-like rubber sheet S (corresponding to a belt-like rubber member) by extruding rubber onto a drum outer peripheral surface 3a (corresponding to a forming surface) of a rotary drum 3 by an extruder 2. In the following description, the bead core 8 in the present embodiment has a hexagonal cross section. However, the cross section of the bead core that can be covered by a bead core covering method and the bead core covering apparatus according to the present embodiment is not limited to have a hexagonal shape, and may have a rectangular shape, a circular shape, or the like.

FIG. 1 is a schematic diagram illustrating an example of a configuration of the bead core covering apparatus 1. The bead core covering apparatus 1 includes the extruder 2, the rotary drum 3, a covering device 4, and a control unit 5 that controls the extruder 2, the rotary drum 3, and the covering device 4.

Figure 2:
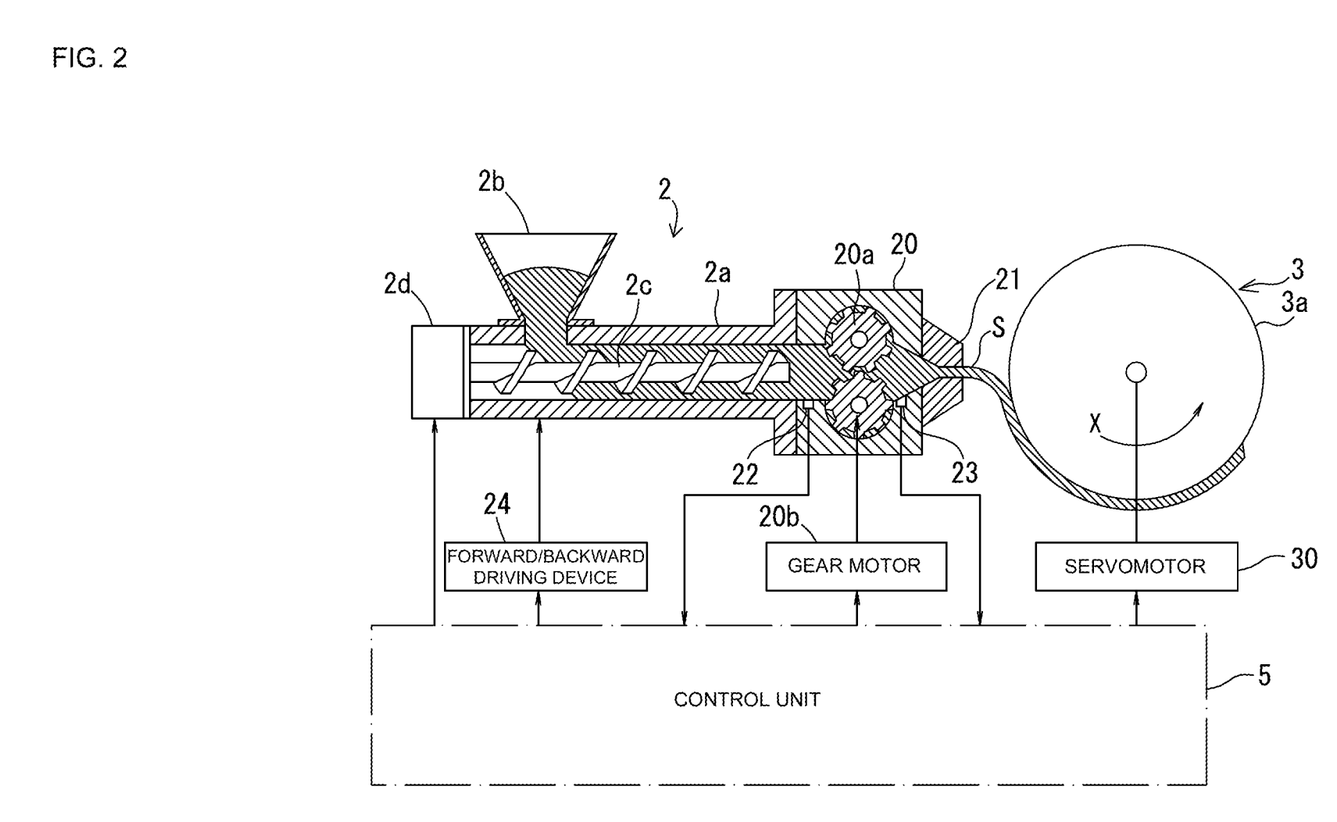
FIG. 2 is a schematic diagram illustrating an example of configurations of an extruder and a rotary drum.

FIG. 2 is a schematic diagram illustrating an example of configurations of the extruder 2 and the rotary drum 3. The extruder 2 includes a cylindrical barrel 2a, a hopper 2b connected to a supply port of the barrel 2a, a screw 2c that kneads and feeds rubber to a tip side, and a screw motor 2d that rotationally drives the screw 2c. The rotation speed of the screw motor 2d is controlled by the control unit 5 as described later.

A gear pump 20 is connected to the tip side of the extruder 2 in the extrusion direction, and a tip of the gear pump 20 is connected to a die 21. A rubber material kneaded by the extruder 2 is supplied to the gear pump 20, and the gear pump 20 supplies a given amount of rubber to the die 21. The rubber sheet S is extruded in a predetermined extrusion amount from the die 21.

The gear pump 20 has a pair of gears 20*a*, and has a function of feeding rubber to an outlet side toward the die 21. Each of the pair of gears 20*a* is rotated and driven by a gear motor 20*b*, and the rotation speed of the gears 20*a* is controlled by the control unit 5. The extrusion amount of the rubber sheet S extruded from the die 21 can be controlled by controlling the rotation speed of the gear motor 20*b* and the rotation speed of the screw motor 2*d* in conjunction with each other by the control unit 5. For convenience of illustration, the pair of gears 20*a* is arranged in the vertical direction in FIG. 2, but they may be actually arranged in the planar direction (direction in which rotation axes of the gears 20*a* are oriented in the vertical direction in FIG. 2).

A first pressure sensor 22 is provided on the inlet side of the gear pump 20, that is, on the side close to the extruder 2, and detects the pressure of rubber supplied from the extruder 2. A second pressure sensor 23 is provided on the outlet side of the gear pump 20, and detects the pressure of the rubber sheet S extruded from the die 21.

The pressure on the inlet side of the gear pump 20 is determined by the amount of rubber fed by the gears 20*a* of the gear pump 20 and the screw 2*c* of the extruder 2. By keeping the pressure on the inlet side constant, the gear pump 20 can supply a fixed amount of rubber to the die 21, and the extrusion amount from the die 21 is also stabilized. However, if the pressure on the inlet side is unstable, the extrusion amount from the die 21 varies, which makes it difficult to form the rubber sheet S having a desired dimension.

As a method for controlling the pressure on the inlet side of the gear pump 20, it is known to perform PID control on the rotation speed of the gears 20*a* of the gear pump 20 and the rotation speed of the screw 2*c* of the extruder 2. Such PID control is generally used to continuously extrude rubber in a given amount.

The control unit 5 controls the rotation speed of the screw motor 2*d* of the extruder 2 on the basis of the pressure on the inlet side of the gear pump 20 detected by the first pressure sensor 22. The control unit 5 controls the rotation speed of the gear motor 20*b* on the basis of a predetermined control program (based on a time factor).

The present embodiment shows an example of a so-called external gear pump in which the gear pump 20 is connected to the tip side of the extruder 2 in the extrusion direction. Alternatively, it is also possible to use a gear-pump-equipped extruder in which the gear pump is incorporated in the extruder. In the present invention, the gear-pump-equipped extruder is more preferable than the extruder to which an external gear pump is connected, because it can easily control the extrusion amount, and further, does not require a gear motor, which makes the tip of the extruder compact.

The extruder 2, the gear pump 20, and the die 21 can integrally be moved forward and backward in the extrusion direction by a forward/backward driving device 24, and can move toward and away from the rotary drum 3. Such forward and backward movement is also controlled by the control unit 5.

The rotary drum 3 is rotatable in an X direction by a servomotor 30. The rotational speed of the servomotor 30 is controlled by the control unit 5. The rubber sheet S extruded through the die 21 is supplied to the drum outer peripheral surface 3*a* of the rotary drum 3, and can be wound along the circumferential direction by rotationally driving the rotary drum 3 in the X direction with the rubber sheet S affixed thereto. The drum outer peripheral surface 3*a* of the rotary drum 3 is made of metal. The outer diameter of the rotary drum 3 in the present embodiment is, for example, 200 to 400 mm.

The rotary drum 3 preferably includes a cooling mechanism or a heating mechanism for cooling or heating the outer peripheral surface. As the cooling mechanism or the heating mechanism, a mechanism for circulating cooling water or hot water inside the rotary drum 3 is used, for example. In addition, a surface treatment (sandblasting or the like) or a material for facilitating removal of the rubber sheet S affixed to the drum outer peripheral surface 3*a* of the rotary drum 3 is performed or used for the drum outer peripheral surface 3*a* of the rotary drum 3. On the other hand, in order to allow the rubber to be easily affixed, a plating treatment such as hard chromium plating or buffing is preferably performed on a part of the drum outer peripheral surface 3*a*, specifically, a portion where a front end S1 and a rear end S3 of the rubber sheet S to be described later are formed.

The covering device 4 supports the bead core 8 such that the drum outer peripheral surface 3*a* of the rotary drum 3 and the outer surface of the bead core 8 are close to each other at a position forward in the rotation direction X of the rotary drum 3 with respect to the extruder 2, and rotates the supported bead core 8. In the present embodiment, the position where the tip of the die 21 of the extruder 2 and the outer peripheral surface of the rotary drum 3 are closest to each other and the position where the inner peripheral surface of the bead core 8 and the drum outer peripheral surface 3*a* of the rotary drum 3 are closest to each other are shifted by 180° in the rotation direction X of the rotary drum 3. In the present embodiment, the outer diameter of the rotary drum 3 is smaller than the inner diameter of the bead core 8, and the rotary drum 3 is disposed on the inner peripheral side of the bead core 8 supported by the covering device 4.

The covering device 4 is for winding the rubber sheet S affixed to the outer surface of the bead core 8 along the cross-sectional shape of the bead core 8. The covering device 4 can rotate the supported bead core 8 in a Y direction. The bead core 8 rotates as the rotary drum 3 rotates.

Figure 3:
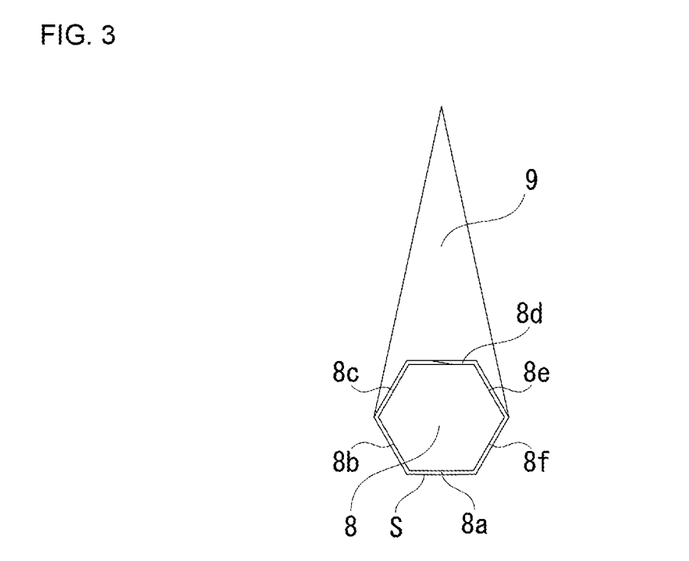
FIG. 3 is a cross-sectional view of a bead core.

FIG. 3 is a cross-sectional view of the bead core 8. The bead core 8 of the present embodiment has a hexagonal cross section, and the inner peripheral surface of the bead core 8 is defined as a lower surface 8*a*, the outer peripheral surface is defined as an upper surface 8*d*, the side surfaces on the inner peripheral side are defined as lower side surfaces 8*b* and 8*f*, and the side surfaces on the outer peripheral side are defined as upper side surfaces 8*c* and 8*e*. The rubber sheet S is wound around the surface of the bead core 8. A bead filler 9 having a substantially triangular cross section is disposed on the outer peripheral side of the bead core 8. The inner diameter of the bead core 8 of the present embodiment is, for example, 400 to 650 mm.

The covering device 4 includes a pressing roller 41, a first forming roller 42, lower-side-surface press-bonding rollers 43, a second forming roller 44, a first upper-side-surface press-bonding roller 45, a first bending roller 46, a second upper-side-surface press-bonding roller 47, a second bending roller 48, and a finishing roller 49 in this order from the rear side to the front side in the rotation direction Y of the bead core 8. The covering device 4 is also provided with a plurality of guide rollers 40 that prevent meandering of the rotating bead core 8.

Figure 4A:
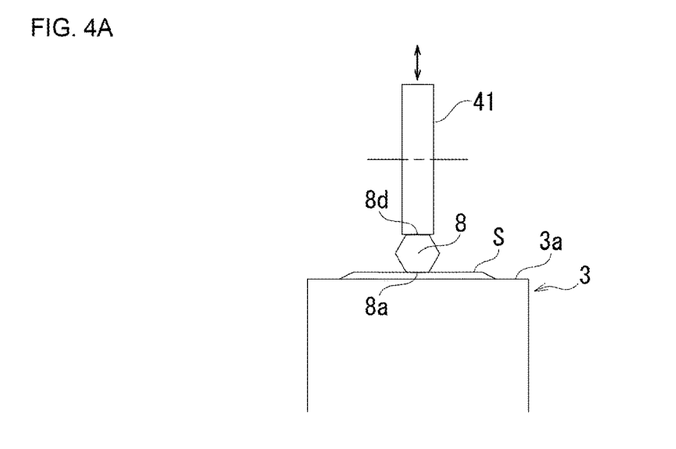
FIG. 4A is a cross-sectional view taken along line A-A of FIG. 1.

FIG. 4A is a cross-sectional view taken along line A-A of FIG. 1. The rubber sheet S is wound around the drum outer peripheral surface 3*a* of the rotary drum 3. In the cross section of the rubber sheet S of the present embodiment, both ends in the width direction are thin, and when the rubber sheet S is wound around the surface of the bead core 8 and both ends in the width direction are joined, the thinned portions are overlapped with each other to prevent an increase in thickness of a joint portion.

The pressing roller 41 is disposed at a position facing the rotary drum 3 with a part of the bead core 8 interposed therebetween. The rotation axis of the pressing roller 41 is parallel to the rotation axes of the rotary drum 3 and the bead core 8, and the pressing roller 41 rotates while in contact with the upper surface 8*d* of the bead core 8 at the outer peripheral surface. The pressing roller 41 is movable inward and outward in the radial direction of the bead core 8. As a result, when a part of the rubber sheet S in the width direction on the drum outer peripheral surface 3*a* is affixed to the lower surface 8*a* of the rotating bead core 8, the pressing roller 41 can press the upper surface 8*d* of the bead core 8. The pressing roller 41 is a driven roller that rotates with the rotation of the bead core 8.

Figure 4B:
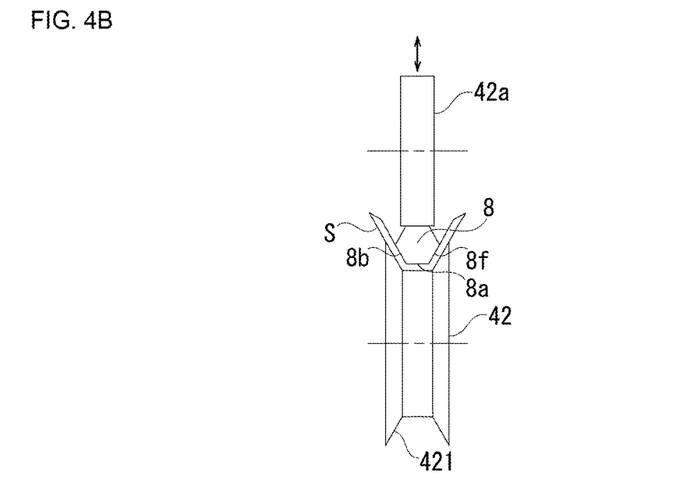
FIG. 4B is a cross-sectional view taken along line B-B of FIG. 1.

FIG. 4B is a cross-sectional view taken along line B-B of FIG. 1. The first forming roller 42 is disposed on the inner peripheral side of the bead core 8. The rotation axis of the first forming roller 42 is parallel to the rotation axis of the bead core 8. As illustrated in FIG. 4B, the first forming roller 42 has a bobbin shape in which the central part is recessed with respect to the left and right parts. A recess 421 of the first forming roller 42 is disposed so as to be in contact with the lower surface 8*a* and the left and right lower side surfaces 8*b* and 8*f* of the bead core 8 with the rubber sheet S therebetween. An auxiliary roller 42*a* which is movable inward and outward in the radial direction of the bead core 8 is disposed at a position facing the first forming roller 42 with the bead core 8 interposed therebetween. The rotation axis of the auxiliary roller 42*a* is parallel to the rotation axes of the first forming roller 42 and the bead core 8. Thus, the rubber sheet S can be folded upward along the left and right lower side surfaces 8*b* and 8*f* of the bead core 8 by the recess 421 of the first forming roller 42. The first forming roller 42 and the auxiliary roller 42*a* are driven rollers that rotate with the rotation of the bead core 8.

Figure 4C:
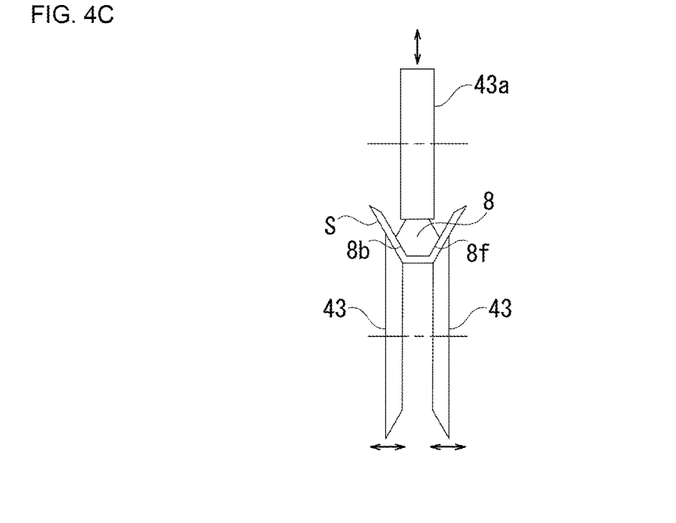
FIG. 4C is a cross-sectional view taken along line C-C of FIG. 1.

FIG. 4C is a cross-sectional view taken along line C-C of FIG. 1. The lower-side-surface press-bonding rollers 43 are disposed on the inner peripheral side of the bead core 8. The rotation axes of the lower-side-surface press-bonding rollers 43 are parallel to the rotation axis of the bead core 8. The lower-side-surface press-bonding rollers 43 are provided so as to face the left and right parts of the bead core 8, respectively. The pair of lower-side-surface press-bonding rollers 43 is movable to the left and right in the width direction of the bead core 8. The lower-side-surface press-bonding rollers 43 have a shape of a truncated cone, and are disposed such that outer peripheral surfaces which are tapered surfaces are in contact with the lower side surfaces 8*b* and 8*f* of the bead core 8, respectively, with the rubber sheet S interposed therebetween. An auxiliary roller 43*a* which is movable inward and outward in the radial direction of the bead core 8 is disposed at a position facing the lower-side-surface press-bonding rollers 43 with the bead core 8 interposed therebetween. The rotation axis of the auxiliary roller 43*a* is parallel to the rotation axes of the lower-side-surface press-bonding rollers 43 and the bead core 8. With this configuration, the rubber sheet S can be bonded to the lower side surfaces 8*b* and 8*f* of the bead core 8 under pressure by the lower-side-surface press-bonding rollers 43. The lower-side-surface press-bonding rollers 43 are drive rollers driven by a motor (not illustrated), and the auxiliary roller 43*a* is a driven roller that rotates with the rotation of the bead core 8.

Figure 4D:
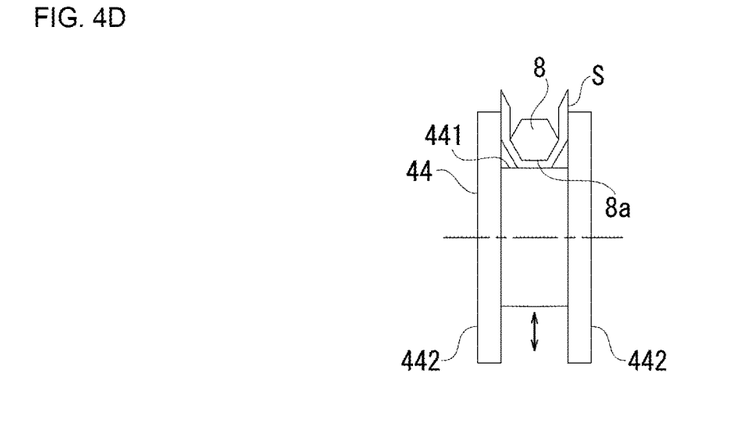
FIG. 4D is a cross-sectional view taken along line D-D of FIG. 1.

FIG. 4D is a cross-sectional view taken along line D-D of FIG. 1. The second forming roller 44 is disposed on the inner peripheral side of the bead core 8. The rotation axis of the second forming roller 44 is parallel to the rotation axis of the bead core 8. The second forming roller 44 includes a body part 441 that rotates along the lower surface 8*a* of the bead core 8 and disk-shaped flanges 442 provided at both ends of the body part 441. The interval between the left and right flanges 442 is substantially the same as the width obtained by adding the thickness of the rubber sheet S on both sides to the width of the bead core 8. The second forming roller 44 is movable inward and outward in the radial direction of the bead core 8. Thus, both ends of the rubber sheet S in the width direction can be raised upward by the flanges 442 of the second forming roller 44. The second forming roller 44 is a driven roller that rotates with the rotation of the bead core 8.

Figure 4E:
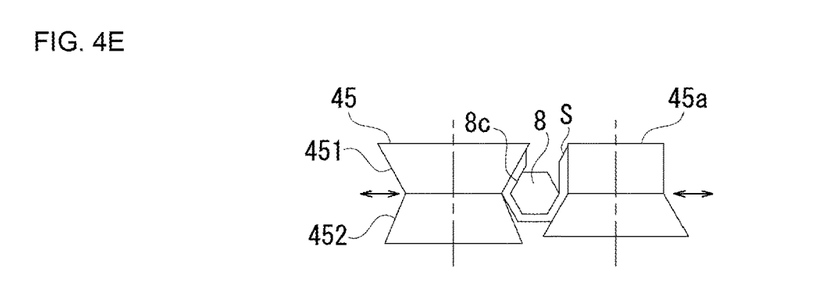
FIG. 4E is a cross-sectional view taken along line E-E of FIG. 1.

FIG. 4E is a cross-sectional view taken along line E-E of FIG. 1. The first upper-side-surface press-bonding roller 45 is disposed on the side of the bead core 8. The rotation axis of the first upper-side-surface press-bonding roller 45 is parallel to the radial direction of the bead core 8. The first upper-side-surface press-bonding roller 45 has a bobbin shape in which two truncated cone parts 451 and 452 are joined. The outer peripheral surface of the truncated cone part 451 is disposed so as to be in contact with the upper side surface 8*c* of the bead core 8 with the rubber sheet S therebetween. The first upper-side-surface press-bonding roller 45 is movable to the left and right in the width direction of the bead core 8. An auxiliary roller 45*a* which is movable to the left and right in the width direction of the bead core 8 is disposed at a position facing the first upper-side-surface press-bonding roller 45 with the bead core 8 interposed therebetween. The rotation axis of the auxiliary roller 45*a* is parallel to the rotation axis of the first upper-side-surface press-bonding roller 45. Thus, the rubber sheet S can be bent and bonded to the upper side surface 8*c* of the bead core 8 under pressure by the truncated cone part 451 of the first upper-side-surface press-bonding roller 45. The first upper-side-surface press-bonding roller 45 is a drive roller driven by a motor (not illustrated), and the auxiliary roller 45*a* is a driven roller that rotates with the rotation of the bead core 8.

Figure 4F:
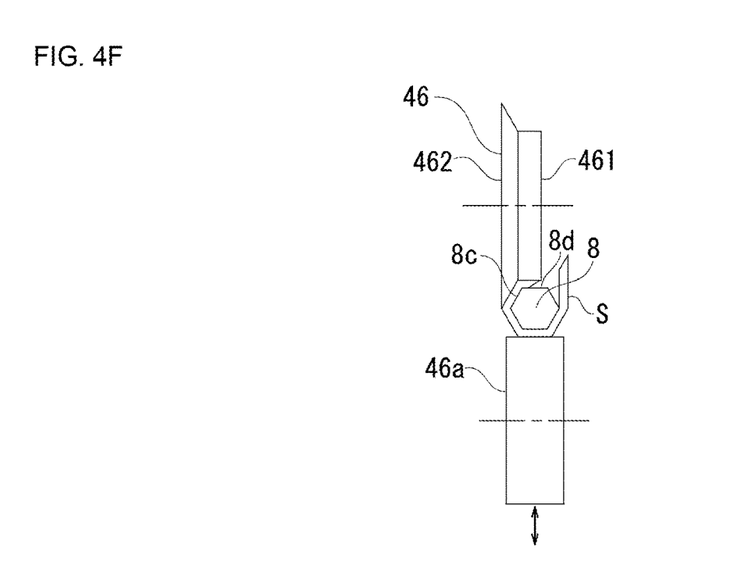
FIG. 4F is a cross-sectional view taken along line F-F of FIG. 1.

FIG. 4F is a cross-sectional view taken along line F-F of FIG. 1. The first bending roller 46 is disposed on the outer peripheral side of the bead core 8. The rotation axis of the first bending roller 46 is parallel to the rotation axis of the bead core 8. The first bending roller 46 includes a cylindrical part 461 that rotates along the upper surface 8*d* of the bead core 8 and a truncated cone part 462 provided at one end of the cylindrical part 461. The outer peripheral surface of the truncated cone part 462 is disposed so as to be in contact with the upper side surface 8*c* of the bead core 8 with the rubber sheet S therebetween. An auxiliary roller 46*a* which is movable inward and outward in the radial direction of the bead core 8 is disposed at a position facing the cylindrical part 461 of the first bending roller 46 with the bead core 8 interposed therebetween. The rotation axis of the auxiliary roller 46*a* is parallel to the rotation axes of the first bending roller 46 and the bead core 8. Thus, one end of the rubber sheet S can be bent and bonded under pressure along the upper surface 8*d* of the bead core 8 by the cylindrical part 461 of the first bending roller 46. The first bending roller 46 is a drive roller driven by a motor (not illustrated), and the auxiliary roller 46a is a driven roller that rotates as the bead core 8 rotates.

Figure 4G:
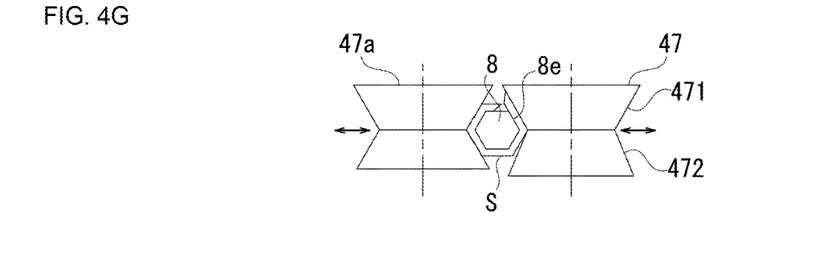
FIG. 4G is a cross-sectional view taken along line G-G of FIG. 1.

FIG. 4G is a cross-sectional view taken along line G-G of FIG. 1. The second upper-side-surface press-bonding roller 47 is disposed on the side of the bead core 8. The rotation axis of the second upper-side-surface press-bonding roller 47 is parallel to the radial direction of the bead core 8. The second upper-side-surface press-bonding roller 47 has a bobbin shape in which two truncated cone parts 471 and 472 are joined. The outer peripheral surface of the truncated cone part 471 is disposed so as to be in contact with the upper side surface 8e of the bead core 8 with the rubber sheet S therebetween. The second upper-side-surface press-bonding roller 47 is movable to the left and right in the width direction of the bead core 8. An auxiliary roller 47a which is movable to the left and right in the width direction of the bead core 8 is disposed at a position facing the second upper-side-surface press-bonding roller 47 with the bead core 8 interposed therebetween. The rotation axis of the auxiliary roller 47a is parallel to the rotation axis of the second upper-side-surface press-bonding roller 47. Thus, the rubber sheet S can be bent and bonded under pressure to the upper side surface 8e of the bead core 8 by the truncated cone part 471 of the second upper-side-surface press-bonding roller 47. The second upper-side-surface press-bonding roller 47 is a drive roller driven by a motor (not illustrated), and the auxiliary roller 47a is a driven roller that rotates as the bead core 8 rotates.

Figure 4H:
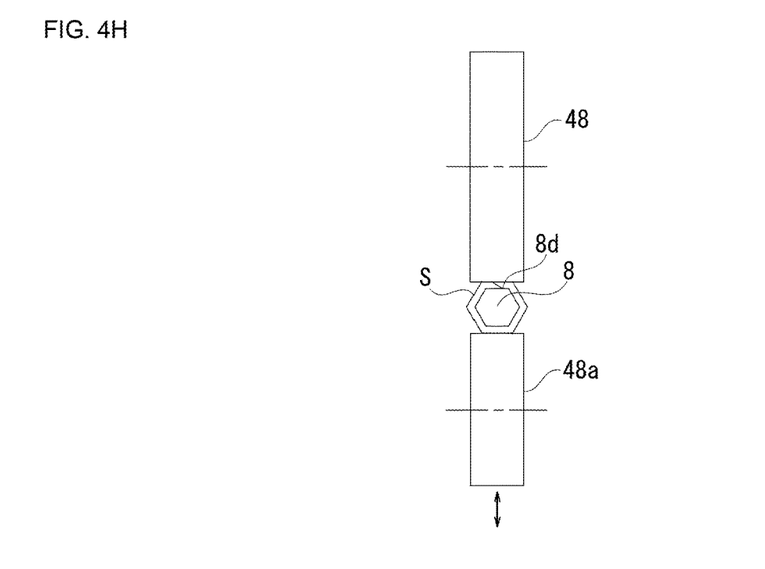
FIG. 4H is a cross-sectional view taken along line H-H of FIG. 1.

FIG. 4H is a cross-sectional view taken along line H-H of FIG. 1. The second bending roller 48 is disposed on the outer peripheral side of the bead core 8. The rotation axis of the second bending roller 48 is parallel to the rotation axis of the bead core 8. The second bending roller 48 rotates along the upper surface 8d of the bead core 8. An auxiliary roller 48a which is movable inward and outward in the radial direction of the bead core 8 is disposed at a position facing the second bending roller 48 with the bead core 8 interposed therebetween. The rotation axis of the auxiliary roller 48a is parallel to the rotation axes of the second bending roller 48 and the bead core 8. Thus, the other end of the rubber sheet S can be bent and bonded under pressure along the upper surface 8d of the bead core 8 by the second bending roller 48. The second bending roller 48 is a drive roller driven by a motor (not illustrated), and the auxiliary roller 48a is a driven roller that rotates as the bead core 8 rotates.

Figure 4I:
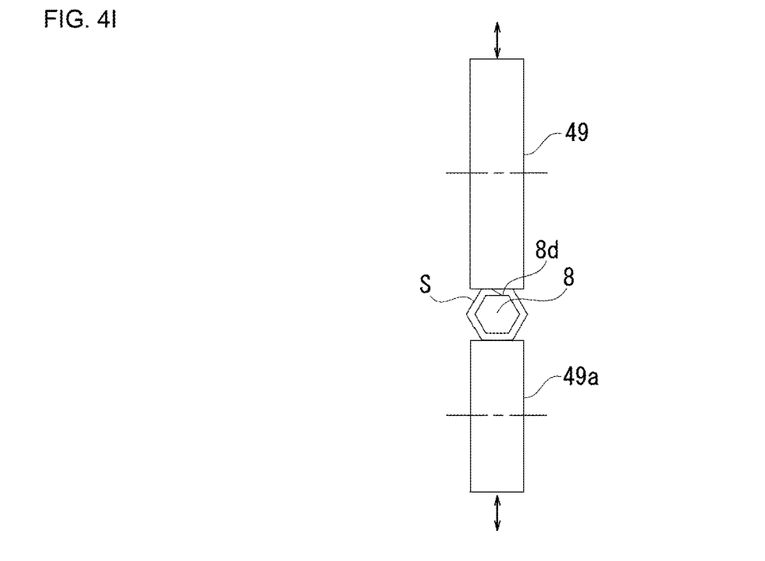
FIG. 4I is a cross-sectional view taken along line I-I of FIG. 1.

FIG. 4I is a cross-sectional view taken along line I-I of FIG. 1. The finishing roller 49 is disposed on the outer peripheral side of the bead core 8. The rotation axis of the finishing roller 49 is parallel to the rotation axis of the bead core 8. The finishing roller 49 rotates along the upper surface 8d of the bead core 8. The finishing roller 49 is movable inward and outward in the radial direction of the bead core 8. An auxiliary roller 49a which is movable inward and outward in the radial direction of the bead core 8 is disposed at a position facing the finishing roller 49 with the bead core 8 interposed therebetween. The rotation axis of the auxiliary roller 49a is parallel to the rotation axes of the finishing roller 49 and the bead core 8. Thus, both ends of the rubber sheet S can be bonded under pressure to the upper surface 8d of the bead core 8 by the finishing roller 49. The finishing roller 49 is a drive roller driven by a motor (not illustrated), and the auxiliary roller 49a is a driven roller that rotates as the bead core 8 rotates. In addition, the finishing roller 49 and the auxiliary roller 49a may include a temperature adjustment mechanism that heats the rollers in order to increase the press-bonding force. Examples of the temperature adjustment mechanism include a temperature adjustment mechanism using hot water, a heater, a gas, or the like.

Next, the bead core covering method using the bead core covering apparatus 1 will be described. The bead core covering method according to the present embodiment includes: a step for winding the rubber sheet S extruded by the extruder 2 through the die 21 around the drum outer peripheral surface 3a of the rotary drum 3 from a front end; a step for affixing, from the front end, a part in the width direction of the rubber sheet S located on the drum outer peripheral surface 3a to the outer surface of the rotating bead core 8 before the rubber sheet S is wound around the entire circumference of the drum outer peripheral surface 3a; and a step for winding and affixing the remaining part in the width direction of the rubber sheet S having been affixed to the outer surface of the bead core 8 along the cross-sectional shape of the bead core 8 sequentially from the part in the width direction toward an end in the width direction.

First, the bead core 8 is set in the covering device 4. At this time, the extruder 2 is disposed outside the covering device 4.

Next, the extruder 2 is moved forward to the rotary drum 3 so as to bring the die 21 close to the drum outer peripheral surface 3a.

Next, the extrusion of the rubber sheet S from the die 21 of the extruder 2 is started, and at the same time, the rotary drum 3 starts to rotate. More specifically, the rotary drum 3 starts to rotate, when the rotation of the screw 2c of the extruder 2 is started, and the pressure on the outlet side of the gear pump 20 detected by the second pressure sensor 23 reaches a predetermined value. Thus, the extruded rubber sheet S can be wound around the drum outer peripheral surface 3a from the front end.

Next, the central part in the width direction of the rubber sheet S wound on the drum outer peripheral surface 3a is affixed to the lower surface 8a of the rotating bead core 8 from the front end (see FIG. 4A).

Next, both ends in the width direction of the rubber sheet S affixed to the lower surface 8a of the bead core 8 are wound along the cross-sectional shape of the bead core 8 by the covering device 4 (see FIGS. 4B to 4I). Finally, the extruder 2 is retracted, and the bead core 8 covered with the rubber sheet S is removed from the covering device 4.

Further, the method for forming the belt-like rubber sheet S according to the present embodiment includes:
  an extrusion start step for bringing the die 21 of the extruder 2 close to the drum outer peripheral surface 3a of the rotary drum 3 until a distance between the die 21 and the drum outer peripheral surface 3a reaches an extrusion start distance, starting extrusion of rubber from the die 21, and starting rotation of the drum outer peripheral surface 3a;
  a front end forming step for forming a front end S1 having a wedge-shaped cross section by gradually increasing an extrusion amount of the rubber from zero to a predetermined extrusion amount in a predetermined time, gradually increasing the rotational speed of the drum outer peripheral surface 3a from zero to a predetermined rotational speed in the predetermined time, and gradually increasing the distance from the outer peripheral surface 3a to the die 21 from the extrusion start distance to a predetermined distance that is equal to a desired thickness of the rubber sheet S in the predetermined time;
  an intermediate part forming step for forming an intermediate part S2 having the desired thickness by maintaining the extrusion amount of the rubber at the predetermined extrusion amount, maintaining the rotational speed of the drum outer peripheral surface 3a at the predetermined rotational speed, and maintaining the distance from the drum outer peripheral surface 3a to the die 21 at the predetermined distance; and a rear end forming step for forming a rear end S3 having a wedge-shaped cross section by gradually decreasing the extrusion amount of the rubber from the predetermined extrusion amount to zero in the predetermined time, gradually decreasing the rotational speed of the drum outer peripheral surface 3a from the predetermined rotational speed to zero in the predetermined time, and gradually decreasing the distance from the drum outer peripheral surface 3a to the die 21 from the predetermined distance to an extrusion end distance in the predetermined time.

Figure 5:
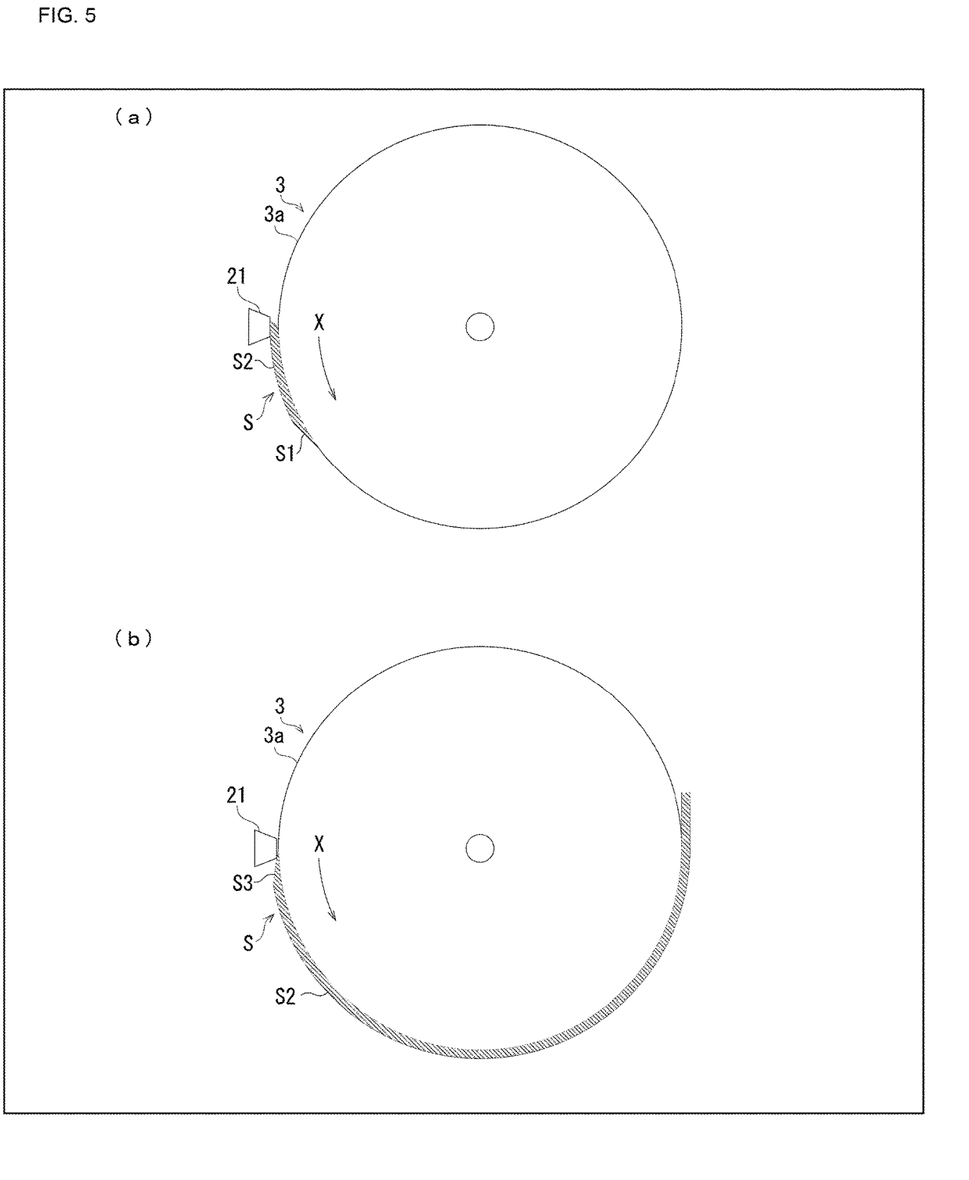
FIG. 5 is a schematic diagram illustrating a state of forming a rubber sheet.
Figure 6:
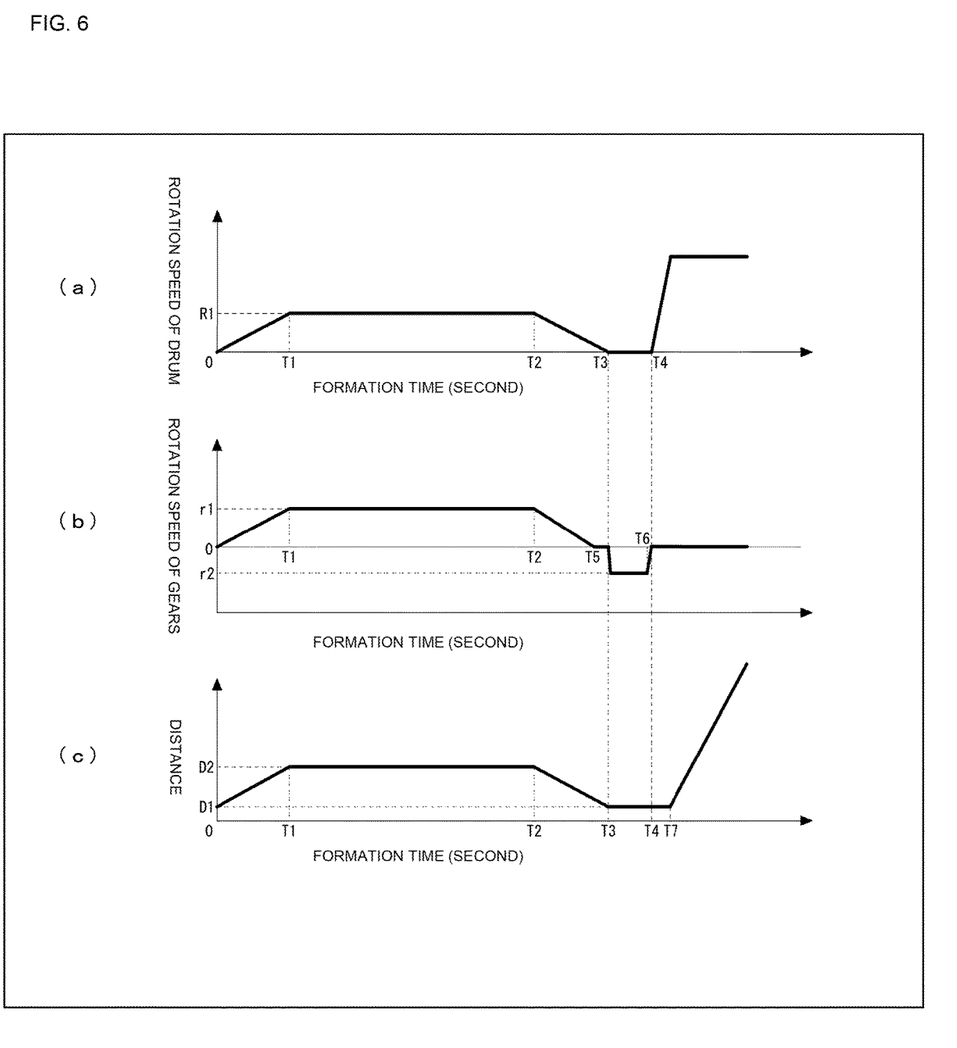
FIG. 6 is a graph illustrating temporal changes in a rotation speed of the rotary drum, a rotation speed of a gear of a gear pump, and a distance from a die to a drum outer peripheral surface when the rubber sheet is formed.

FIG. 5 is a schematic diagram illustrating a state of forming the rubber sheet S. FIG. 6(a) illustrates a temporal change in the rotation speed of the rotary drum 3, FIG. 6(b) illustrates a temporal change in the rotation speed of gears of the gear pump 20, and FIG. 6(c) illustrates a temporal change in the distance from the die 21 to the drum outer peripheral surface 3a of the rotary drum 3.

First, the extruder 2, the gear pump 20, and the die 21 are integrally moved forward to bring the die 21 close to the rotary drum 3. At this time, the die 21 is brought close to the drum outer peripheral surface 3a of the rotary drum 3 until the distance from the die 21 to the drum outer peripheral surface 3a reaches an extrusion start distance (D1 in this example). D1 is preferably 0.1 to 0.3 mm.

Next, the rubber material of the rubber sheet S adjusted in the previous step is injected into the hopper 2b of the extruder 2 and filled in the extruder 2. Here, the rubber material is not particularly limited, and examples thereof include those prepared by kneading a compounding material with a general-purpose rubber raw material such as natural rubber, styrene-butadiene rubber (SBR), butadiene rubber (BR), or isoprene rubber (IR) by a conventional method to enable heat crosslinking. The shape of the rubber material to be injected is not particularly limited, and examples thereof include a ribbon shape, a sheet shape, and a pellet shape.

The rubber material injected into the hopper 2b is kneaded by the screw 2c of the extruder 2, fed to the tip side in the extrusion direction, and supplied to the gear pump 20. Then, the rubber material supplied to the gear pump 20 is fed to the outlet side toward the die 21 by the pair of rotating gears 20a.

The rubber starts to be extruded from the die 21 by the rotation of the gears 20a. At the same time, the rotary drum 3 starts to rotate. More specifically, the rotary drum 3 starts to rotate, when the rotation of the screw 2c of the extruder 2 is started, and the pressure on the outlet side of the gear pump 20 detected by the second pressure sensor 23 reaches a predetermined value.

As illustrated in FIG. 6(a), the rotation speed of the rotary drum 3 is gradually increased from zero to a predetermined rotation speed (R1 in this example) in a predetermined time (T1 in this example). The rotation speed of the rotary drum 3 is accelerated at a constant acceleration.

As illustrated in FIG. 6(b), the rotation speed of the gears of the gear pump 20 is gradually increased from zero to a predetermined rotation speed (r1 in this example) in a predetermined time (T1 in this example). As a result, an extrusion amount of the rubber is gradually increased from zero to a predetermined extrusion amount in a predetermined time (T1 in this example).

In addition, the die 21 is gradually retracted at a constant speed as the extrusion amount of rubber increases. The distance from the drum outer peripheral surface 3a to the die 21 is gradually increased from the extrusion start distance D1 to a predetermined distance (D2 in this example) in a predetermined time (T1 in this example) as illustrated in FIG. 6(c).

By controlling the rotation speed of the rotary drum 3, the extrusion amount of the rubber, and the distance from the drum outer peripheral surface 3a to the die 21 in this manner, the front end S1 of the rubber sheet S can be formed into a wedge shape in cross section (see FIG. 5(a)). The rotation speed of the rotary drum 3, the rotation speed of the gears, and the distance from the drum outer peripheral surface 3a to the die 21 are appropriately set such that the front end S1 has a wedge-shaped cross section with a desired width and length. The predetermined time T1 is preferably 1 second or more, and more preferably, 3 seconds or more.

Thereafter, the rotation speed of the gears is maintained at a predetermined rotation speed r1 as shown in FIG. 6(b) to maintain the extrusion amount of the rubber at a predetermined extrusion amount, the rotation speed of the rotary drum 3 is maintained at a predetermined rotation speed R1 as shown in FIG. 6(a), and the distance from the drum outer peripheral surface 3a to the die 21 is maintained at a predetermined distance D2 as shown in FIG. 6(c). Here, the predetermined distance D2 corresponds to a desired thickness of the rubber sheet S to be formed, and the extruded rubber passing through a gap between the die 21 and the drum outer peripheral surface 3a has a thickness D2. Thus, the intermediate part S2 having a desired thickness D2 can be formed (see FIG. 5(a)).

When the intermediate part S2 having a length necessary for covering the outer surface of the bead core 8 is formed (at timing T2 in this example), the rotation speed of the rotary drum 3 is gradually decreased from the predetermined rotation speed R1 to zero within a predetermined time (time from T2 to T3 in this example) as illustrated in FIG. 6(a). The time from T2 to T3 is the same as the time T1.

In addition, the rotation speed of the gears of the gear pump 20 is gradually decreased from the predetermined rotation speed r1 to zero within a predetermined time (time from T2 to T5 in this example) as shown in FIG. 6(b). As a result, the extrusion amount of the rubber is gradually decreased from the predetermined extrusion amount to zero within a predetermined time (time from T2 to T3 in this example). Here, a timing T5 at which the rotation speed of the gears is set to zero is the same as or 0.1 to 1 second earlier than the timing T3 at which the rotary drum 3 stops.

In addition, the distance from the drum outer peripheral surface 3a to the die 21 is gradually reduced from the predetermined distance D2 to an extrusion end distance (D1 in this example) within a predetermined time (time from T2 to T3 in this example) as illustrated in FIG. 6(c). In the present embodiment, the extrusion end distance is D1 which is the same as the extrusion start distance, but the extrusion end distance may be 0.1 to 0.2 mm longer than the extrusion start distance.

By controlling the rotation speed of the rotary drum 3, the extrusion amount of the rubber, and the distance from the drum outer peripheral surface 3a to the die 21 in this manner, the rear end S3 of the rubber sheet S can be formed into a wedge shape in cross section (see FIG. 5(b)). The rear end S3 is overlapped on the front end S1 on the outer surface of the bead core 8. As a result, the thickness of a joint portion between the front end S1 and the rear end S3 is substantially the same as the thickness D2 of the intermediate part S2.

After the rear end S3 is formed, the extrusion amount of the rubber is maintained at zero, the rotation speed of the rotary drum 3 is maintained at zero, and the distance from the drum outer peripheral surface 3a to the die 21 is maintained at the extrusion end distance for a predetermined time (time from T3 to T4 in this example). In the present embodiment, the time from T3 to T4 is 1 to 5 seconds. Thus, the rear end S3 of the rubber sheet S can be reliably affixed to the drum outer peripheral surface 3a.

In addition, after the rear end S3 is formed, the gears 20a of the gear pump 20 are reversely rotated for a predetermined rotation time (time from T3 to T6 in this example) at a predetermined rotation speed (r2 in this example). In the present embodiment, the gears 20a are reversely rotated at 0.5 to 3 rpm for 0.5 to 3 seconds. As a result, the pressure in the die 21 decreases, which can prevent rubber from sagging from the discharge port. In addition, the rubber in the die 21 and the rear end S3 of the rubber sheet S are separated, so that the rear end S3 is easy to be reliably affixed to the drum outer peripheral surface 3a.

After the rear end S3 is affixed, the rotation of the rotary drum 3 is restarted while the distance from the drum outer peripheral surface 3a to the die 21 is maintained at the extrusion end distance. After the rotation of the rotary drum 3 is restarted, the extruder 2 is retracted to separate the die 21 from the rotary drum 3. A timing T7 at which the extruder 2 is retracted is delayed by about 0 to 2 seconds from the timing T4 at which the rotation of the rotary drum 3 is restarted. As a result, the rubber in the die 21 and the rear end S3 of the rubber sheet S are reliably separated.

Figure 7:
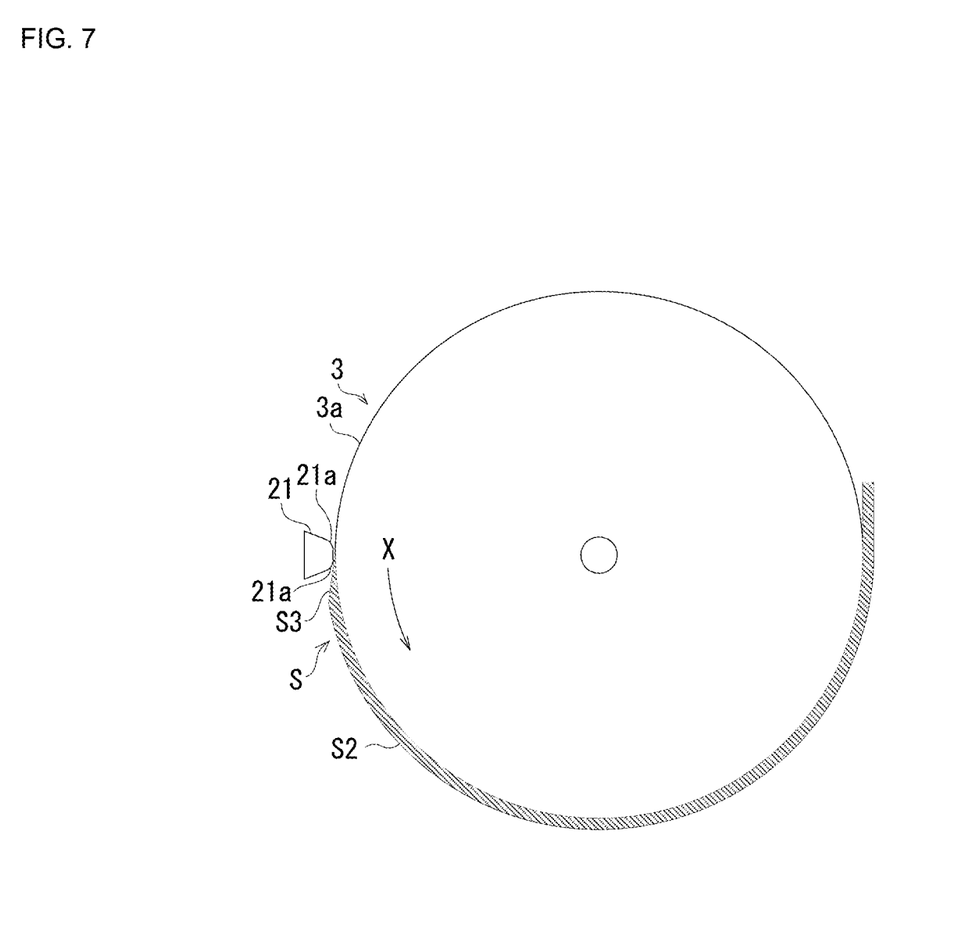
FIG. 7 is a schematic diagram illustrating another example of a configuration of an apparatus for forming a rubber sheet.

Other Embodiments (1) As illustrated in FIG. 7, it is preferable that the end surface of the die 21 facing the drum outer peripheral surface 3a has curved surfaces 21a at edge parts on the front side and the rear side in the rotation direction X of the drum outer peripheral surface 3a. This configuration can prevent the die 21 from coming in contact with the front end S1 and the rear end S3 when the rubber sheet S is formed.

(2) While the abovementioned embodiments indicate examples in which the forming surface is the drum outer peripheral surface 3a which is a curved surface, the forming surface may be a flat surface.

DESCRIPTION OF REFERENCE SIGNS

1 Bead core covering apparatus
2 Extruder
20 Gear pump
20a Gear
21 Die
3 Rotary drum
3a Drum outer peripheral surface
4 Covering device
5 Control unit
8 Bead core
S Rubber sheet
S1 Front end
S2 Intermediate part
S3 Rear end

The invention claimed is:

1. A method for forming a belt-like rubber member by extruding rubber onto a forming surface by an extruder, the method comprising:
    an extrusion start step for bringing a die of the extruder close to the forming surface until a distance between the die and the forming surface reaches an extrusion start distance, starting extrusion of rubber from the die, and starting movement of the forming surface in a direction parallel to the forming surface;
    a front end forming step for forming a front end having a wedge-shaped cross section by gradually increasing an extrusion amount of the rubber from zero to a predetermined extrusion amount in a predetermined time, gradually increasing a movement speed of the forming surface from zero to a predetermined movement speed in the predetermined time, and gradually increasing the distance from the forming surface to the die from the extrusion start distance to a predetermined distance that is equal to a desired thickness of the belt-like rubber member in the predetermined time;
    an intermediate part forming step for forming an intermediate part having the desired thickness by maintaining the extrusion amount of the rubber at the predetermined extrusion amount, maintaining the movement speed of the forming surface at the predetermined movement speed, and maintaining the distance from the forming surface to the die at the predetermined distance; and
    a rear end forming step for forming a rear end having a wedge-shaped cross section by gradually decreasing the extrusion amount of the rubber from the predetermined extrusion amount to zero in the predetermined time, gradually decreasing the movement speed of the forming surface from the predetermined movement speed to zero in the predetermined time, and gradually decreasing the distance from the forming surface to the die from the predetermined distance to an extrusion end distance in the predetermined time.

2. The method for forming a belt-like rubber member according to claim 1, further comprising a rear end affixing step for maintaining the extrusion amount of the rubber at zero, maintaining the movement speed of the forming surface at zero, and maintaining the distance from the forming surface to the die at the extrusion end distance, after the rear end forming step is completed.

3. The method for forming a belt-like rubber member according to claim 2,
    wherein the extruder is provided with a gear pump capable of supplying the rubber to the die by rotating a gear that is incorporated in the gear pump, and
    the gear in the gear pump is reversely rotated for a predetermined time at a predetermined rotation speed in the rear end affixing step.

4. The method for forming a belt-like rubber member according to claim 2, wherein the movement of the forming surface is restarted while the distance from the forming surface to the die is maintained at the extrusion end distance, after the rear end affixing step is completed.

* * * * *